US010126722B2

(12) United States Patent
Sweet, III et al.

(10) Patent No.: US 10,126,722 B2
(45) Date of Patent: Nov. 13, 2018

(54) SYSTEM AND METHOD OF DYNAMICALLY CONTROLLING PARAMETERS FOR PROCESSING SENSOR OUTPUT DATA FOR COLLISION AVOIDANCE AND PATH PLANNING

(71) Applicant: QUALCOMM Incorporated, San Diego, CA (US)

(72) Inventors: Charles Wheeler Sweet, III, San Diego, CA (US); Hugo Swart, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 15/224,904

(22) Filed: Aug. 1, 2016

(65) Prior Publication Data

US 2018/0032040 A1  Feb. 1, 2018

(51) Int. Cl.
*G05B 15/02* (2006.01)
*G08G 5/04* (2006.01)
(Continued)

(52) U.S. Cl.
CPC .......... *G05B 15/02* (2013.01); *G05D 1/0246* (2013.01); *G05D 1/101* (2013.01);
(Continued)

(58) Field of Classification Search
CPC .......... B60R 16/0232; B60R 16/0236; G05D 1/0016; G05D 1/0022; G05D 1/0027;
(Continued)

(56) References Cited

U.S. PATENT DOCUMENTS 6,975,246 B1   12/2005  Trudeau
9,097,800 B1    8/2015  Zhu
(Continued)

FOREIGN PATENT DOCUMENTS

EP        2413304 A1     2/2012
JP     2009205386 A     9/2009
(Continued)

OTHER PUBLICATIONS

International Search Report and Written Opinion—PCT/US2017/033989—ISA/EPO—dated Aug. 8, 2017.

*Primary Examiner* — Jerrah Edwards
(74) *Attorney, Agent, or Firm* — The Marbury Law Group, PLLC

(57) ABSTRACT

Various embodiments involve dynamically controlling parameters for processing sensor data, including rates at which vehicle sensors are sampled and analyzed, based on the vehicle's speed and direction. Data or sampling rates of sensors useful for collision avoidance and/or path planning may be adjusted to emphasize data from sensors having a field of view encompassing the travel direction, while limiting processing of data from sensors less likely to provide useful data for such purposes. In some embodiments, the rate at which data from a particular sensor is sampled and/or processed may depend on a vehicle's direction and speed of travel as well as the sensor's field of view. Processing demands may be reduced by focusing processing on data from sensors viewing the direction of travel while reducing processing of data from sensors viewing other directions. In some embodiments, sensor data sampling or processing rates may vary based on collision risk probabilities.

27 Claims, 9 Drawing Sheets

(51) Int. Cl.
  *G05D 1/02* (2006.01)
  *G05D 1/10* (2006.01)
  *G06K 9/00* (2006.01)
  *G08G 5/00* (2006.01)
  *H04N 7/18* (2006.01)
  *H04N 21/4402* (2011.01)
  *H04N 21/414* (2011.01)
  *H04N 21/422* (2011.01)
  *H04N 21/4223* (2011.01)
  *B64C 39/02* (2006.01)

(52) U.S. Cl.
  CPC ....... *G06K 9/00805* (2013.01); *G08G 5/0069* (2013.01); *G08G 5/045* (2013.01); *H04N 7/181* (2013.01); *H04N 21/414* (2013.01); *H04N 21/41407* (2013.01); *H04N 21/41422* (2013.01); *H04N 21/422* (2013.01); *H04N 21/4223* (2013.01); *H04N 21/440281* (2013.01); *B64C 39/024* (2013.01); *B64C 2201/108* (2013.01); *B64C 2201/127* (2013.01)

(58) Field of Classification Search
  CPC .. G05D 1/0055; G05D 1/0061; G05D 1/0066; G05D 1/0088; G05D 1/02; G05D 1/021; G05D 1/0212; G05D 1/0214; G05D 1/0217; G05D 1/0221; G05D 1/0223; G05D 1/0276; G05D 1/0287; G05D 1/0289; G01C 21/34; G08G 1/096
  See application file for complete search history.

(56) References Cited

U.S. PATENT DOCUMENTS

| | | |
|---|---|---|
| 9,122,948 B1 | 9/2015 | Zhu et al. |
| 9,781,378 B2* | 10/2017 | Howe .................. H04N 9/8042 |
| 2003/0169902 A1 | 9/2003 | Satoh |
| 2007/0140527 A1* | 6/2007 | Yamamoto ......... G06K 9/00805 |
| | | 382/104 |
| 2010/0188932 A1 | 7/2010 | Hanks et al. |
| 2011/0013020 A1 | 1/2011 | Jo |
| 2012/0200703 A1* | 8/2012 | Nadir .................. G02B 27/644 |
| | | 348/144 |
| 2013/0278715 A1 | 10/2013 | Nutsch et al. |
| 2013/0321627 A1* | 12/2013 | Turn, Jr. ............... B60W 30/00 |
| | | 348/148 |
| 2015/0241987 A1 | 8/2015 | Liu et al. |
| 2016/0052514 A1 | 2/2016 | Clarke et al. |
| 2016/0073048 A1* | 3/2016 | Howe ..................... H04N 5/77 |
| | | 348/144 |
| 2018/0032042 A1 | 2/2018 | Turpin et al. |

FOREIGN PATENT DOCUMENTS

| | | |
|---|---|---|
| WO | 2016021747 A1 | 2/2016 |
| WO | 2016094568 A1 | 6/2016 |

* cited by examiner

SYSTEM AND METHOD OF DYNAMICALLY CONTROLLING PARAMETERS FOR PROCESSING SENSOR OUTPUT DATA FOR COLLISION AVOIDANCE AND PATH PLANNING

BACKGROUND

Unmanned vehicles, such as an unmanned aerial vehicle (UAV), are typically configured with view sensors (e.g., cameras, radar, etc.) capable of perceiving an environment within a field of view (FOV) in a direction that the sensor is facing. Data from view sensors may be used by an autonomous vehicle to navigate through the environment, including detecting obstacles, determining how to avoid obstacles, path mapping, and/or path finding. For example, a stereoscopic camera on an autonomous vehicle can capture stereoscopic image pairs of the environment in the direction that the stereoscopic camera is facing. A processor (e.g., central processing unit (CPU), system-on-chip (SOC), etc.) processes the stereoscopic image pairs to generate three-dimensional (3D) depth maps of the environment within the field of view of the camera. To enable depth measurements of the environment all around the autonomous vehicles, multiple stereoscopic cameras may be situated so that a combination of the respective fields of view may encompass 360 degrees around the vehicle. However, the use of multiple stereo cameras or other view sensors (e.g., radar, sonar, etc.) increases the processing demands on the processor. The faster the vehicle is moving the faster sensor data (e.g., images) need to be processed to detect obstacles in time to avoid them. However, the vehicle's processor has a limited processing bandwidth (available millions of instructions per second (MIPS)).

SUMMARY

Various embodiments are disclosed for dynamically controlling one or more parameters for processing data received from sensors on a vehicle, including for example the rate at which sensor data from various sensors are processed, based on the direction of travel, orientation, and speed of the vehicle. Various embodiments may include a processor of a vehicle determining a speed and a direction of travel of the vehicle, determining one or more of a view direction and a field of view of each of the sensors, and controlling one or more parameters for processing sensor output data, a data processing rate of output data received from each of the sensors, based on the speed and the direction of travel of the vehicle and the view direction and/or field of view of the sensor.

In some embodiments, controlling one or more parameters for processing output data received from each of the sensors may include controlling a sampling or frame rate of one or more of the sensors. In some embodiments, controlling parameters for processing output data received from each of the sensors may include controlling a sampling or frame rate of one or more of the sensors and controlling a rate at which output data received from one or more of the sensors is processed.

In some embodiments, controlling one or more parameters for processing output data received from each of the sensors may include determining whether the speed of the vehicle exceeds a speed threshold, determining for each sensor whether the view direction of the sensor is directed away from or the field of view of the sensor does not encompass the direction of travel of the vehicle in response to determining that the speed of the vehicle exceeds the speed threshold, and throttling the data processing rate of the output data received from one or more of the sensors in response to determining that the view direction of the one or more sensors is directed away from or the field of view of the one or more sensors does not encompass the direction of travel of the vehicle. In some embodiments, controlling one or more parameters for processing output data received from each of the sensors may include maintaining or increasing the data processing rate of the output data received from one or more of the sensors in response to determining that the view direction of the one or more sensors is aligned with or the field of view of the one or more sensors encompasses the direction of travel of the vehicle. In some embodiments, controlling one or more parameters for processing output data received from each of the sensors may include equalizing the data processing rate of the output data received from the sensors in response to determining that the speed of the vehicle does not exceed the speed threshold.

In some embodiments, determining the speed and the direction of travel of the vehicle may include determining the speed and a next direction of travel of the vehicle in advance of a change in the direction of travel of the vehicle. In such embodiments, controlling the data processing rate of the output data received from each of the sensors may include determining a next data processing rate for processing the output data received from each of the sensors based on the speed and the next direction of travel of the vehicle and the view direction and/or field of view of the sensor, detecting when the vehicle is moving in the next direction of travel, and processing the output data received from each of the sensors at the next data processing rate for the sensor in response to detecting that the vehicle is moving in the next direction of travel.

Some embodiments may further include determining one or more collision risk factors in the view direction and/or the field of view of each sensor, in which controlling one or more parameters for processing rate of the output data received from each of the sensors based on the speed and the direction of travel of the vehicle and the view direction and/or field of view of the sensor may include controlling the data processing rate of the output data received from each of the sensors based on the speed and the direction of travel of the vehicle and the one or more collision risk factors in the view direction and/or the field of view of each sensor. In some embodiments, the one or more collision risk factors may include one or more of an operational characteristic of the sensor, detection of an obstacle within the field of view, a speed of the detected obstacle within the field of view, one or more vehicle handling parameters, a processing characteristic of the processor, or any combination thereof.

Some embodiments may further include controlling a transmit power of each of the plurality of sensors based on the speed and the direction of travel of the vehicle and the view direction and/or field of view of the sensor.

In some embodiments, the sensors may include one or more of cameras, stereoscopic cameras, image sensors, radar sensors, sonar sensors, ultrasound sensors, depth sensors, activate sensors, passive sensors, or any combination thereof. In some embodiments, the vehicle is an unmanned vehicle. In some embodiments, the unmanned vehicle is one of an aerial vehicle, a terrestrial vehicle, a space-based vehicle, or an aquatic vehicle.

Further embodiments include a vehicle and/or a computing device within a vehicle including a processor configured with processor-executable instructions to perform operations of the embodiment methods summarized above. Further embodiments include a non-transitory processor-readable storage medium having stored thereon processor-executable instructions configured to cause a processor to perform operations of the embodiment methods summarized above. Further embodiments include a vehicle and/or a computing device within a vehicle including means for performing functions of the embodiment methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
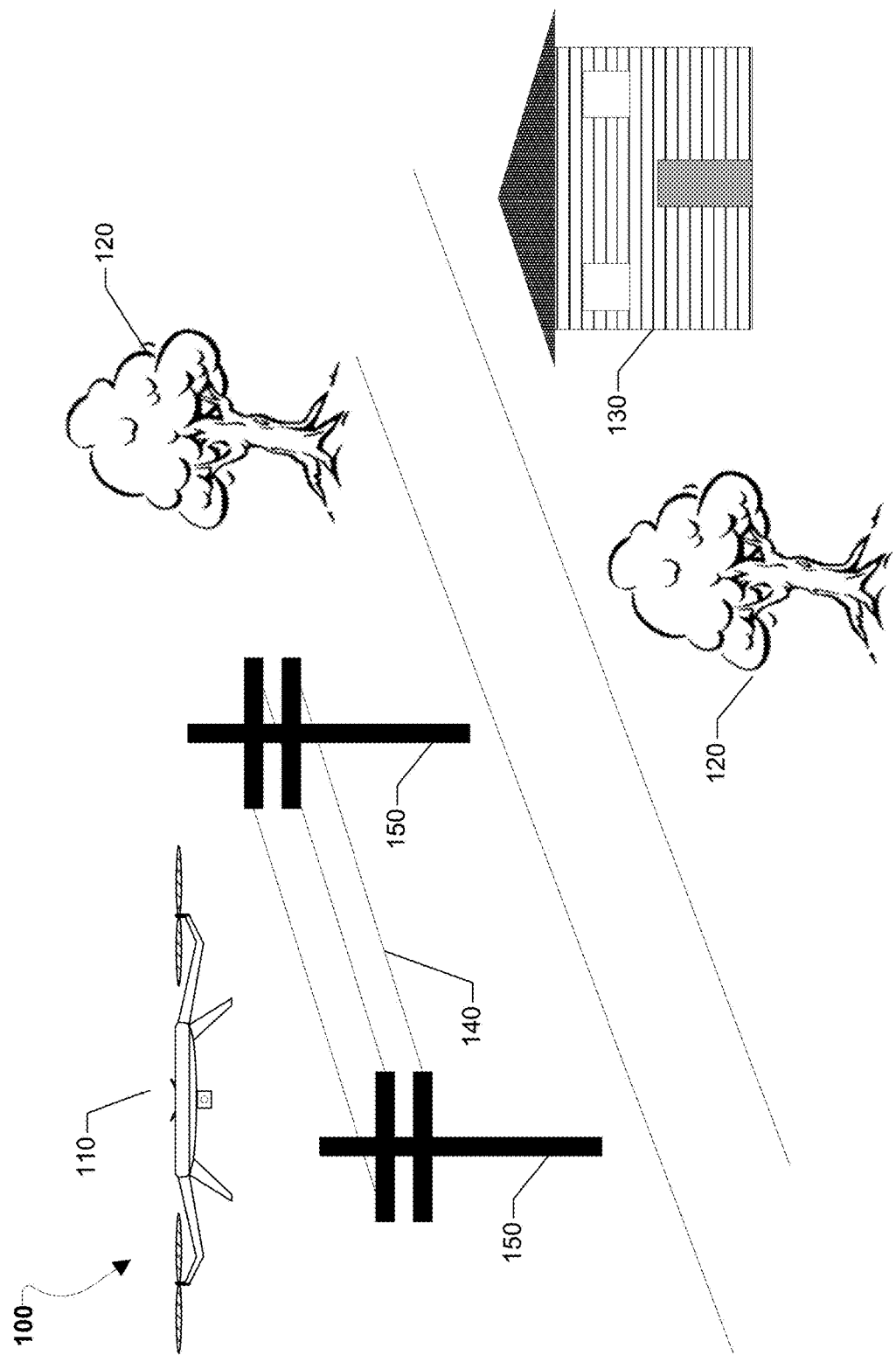
FIG. 1 is a schematic perspective view of an unmanned aerial vehicle (UAV) navigating through an environment in which various embodiments may be applied.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the term "vehicle" refers to one of various types of unmanned or manned vehicles. Unmanned vehicles may be remotely controlled, autonomous, or semi-autonomous. Autonomous (or semi-autonomous) vehicles are capable of sensing their environment and navigating on their own with minimal inputs from a user. Manned vehicles and autonomous vehicles may be periodically controlled by an operator, and thus semi-autonomous. Examples of vehicles suitable for implementing various embodiments include unmanned aerial vehicles (UAVs), including robots or drones; terrestrial vehicles, including automobiles; space-based vehicles, including spacecraft or space probes; and aquatic vehicles, including surface-based or undersea watercraft. Unmanned vehicles are becoming more commonplace in a number of military and commercial applications.

The term "computing device" is used herein to refer to an electronic device equipped with at least a processor. Examples of computing devices may include UAV flight control and/or mission management computer that are onboard the UAV, as well as remote computing devices communicating with the UAV configured to perform operations of the various embodiments. Remote computing devices may include wireless communication devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and servers. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi® router, etc.).

Various embodiments are disclosed for dynamically controlling one or more parameters for processing sensor data received from various view sensors on a vehicle, including, for example, the rate at which sensor data from various view sensors on the vehicle are received and/or processed, based on the direction of travel, orientation, and speed of the vehicle. Various embodiments may be particularly useful for managing the processing of sensor data used by a navigation or collision avoidance system of an autonomous vehicle, such as a UAV. For example, in some embodiments, the rate (or frequency) at which data from a particular view sensor is processed may depend on the current direction and speed of travel and the view direction in which the sensor perceives the environment (i.e., field of view). Processing demands may be reduced by focusing processing on sensor data from view sensors with a field of view encompassing the direction of travel, while reducing the rate or frequency at which data from view sensors with fields of view in directions other than the direction of travel. In some embodiments, the rate of processing data from a given view sensor on the vehicle may be based on a collision risk probability that a vehicle processor may determine as a function of the speed and direction of the vehicle and one or more risk factors, such as the speed of potential threats (e.g., other autonomous vehicles, missiles, birds, etc.).

In some embodiments, the processor may adjust the sampling or frame rate of view sensors in order to reduce the amount of information (bandwidth) carried over internal data buses, and enable data buses with a fixed bandwidth to carry more data from view sensors having a field of view encompassing the direction of travel. In some embodiments, the processor may not control the sampling or frame rate of view sensors, and instead adjust or throttle the rate at which sensor data from each view sensor is analyzed of processed, thus focusing processing resources on data from sensors having a field of view encompassing the direction of travel. In some embodiments, the processor may do both, adjusting the sampling or frame rate of view sensors and adjusting or throttling the rate at which sensor data from each view sensor is analyzed of processed.

In some embodiments, the processor may dynamically control the transmit power of the various view sensors on a vehicle based on the direction of travel, orientation, and speed of the vehicle. For example, the extent to which some view sensors perceive the environment (e.g., distance away from the sensor) may depend on the transmit power of the view sensor (e.g., radar sensors, sonar sensors, etc.). Power demands may be reduced by increasing the transmit power of view sensors with a field of view encompassing the direction of travel, while reducing the transmit power of sensors with fields of view in directions not encompassing the direction of travel.

FIG. 1 is a schematic perspective view of a UAV 110 navigating through an environment 100 in which various embodiments may be applied. With autonomous navigation, there is generally a risk that the unmanned vehicle 110 will collide with structures or objects in the environment that are positioned along the navigational route. For example, the UAV 110 may need to avoid colliding with various obstacles along its flight path including, but are not limited to, trees 120, buildings 130, power/telephone lines 140, and supporting poles 150. The UAV 110 may also need to avoid moving objects, such as people, birds, and other moving vehicles. To counter such risk, the UAV 110 may be configured with a computerized collision avoidance system that senses the environment 100 and causes the vehicle 110 to perform defensive maneuvers in order to avoid collisions with obstacles within the vicinity of the vehicle 110. Such maneuvers may include emergency braking, hovering, reducing speed, changing direction, orientation, or any combination thereof.

Figure 2A:
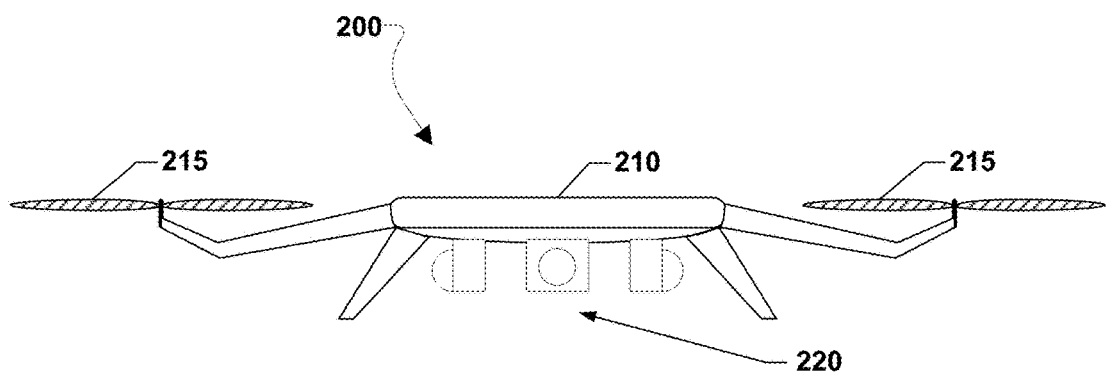
FIGS. 2A and 2B illustrate front elevation and plan views, respectively, of a UAV including multiple view sensors according to some embodiments.
Figure 2B:
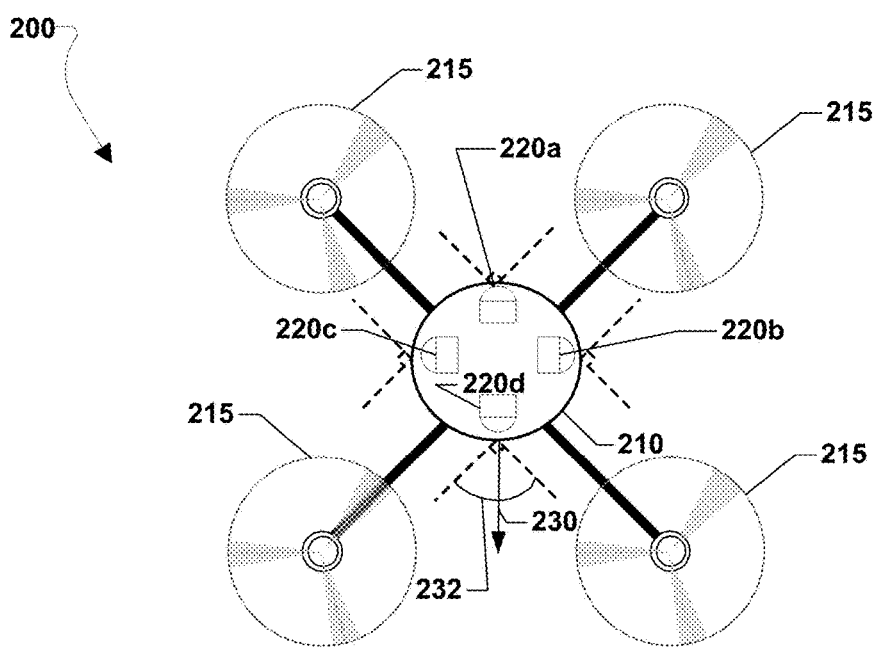

FIGS. 2A and 2B illustrate front elevation and plan views, respectively, of a UAV 200 (which may correspond to the UAV 110 in FIG. 1) including multiple view sensors 220a, 220b, 220c, 220d (collectively 220) according to some embodiments. With reference to FIGS. 1-2B, in some embodiments, the UAV 200 may be equipped with four view sensors 220a, 220b, 220c, 220d for use in a collision avoidance system. In some embodiments, the UAV 200 may include more or less than four view sensors 220a, 220b, 220c, 220d. In some embodiments, the view sensors 220 may include any type of view sensor that is capable of perceiving an environment (e.g., 100) within a limited field of view. For example, the view sensors 220 may include one or more of cameras (e.g., stereoscopic cameras), image sensors, radar sensors, sonar sensors, ultrasound sensors, depth sensors, activate sensors, passive sensors, or any combination thereof. View sensors may include combinations of different view sensors, such as radar plus machine vision sensors, binocular or trinocular camera systems, multispectral camera systems, etc. Different types of view sensors (i.e., view sensors using different technologies) typically have different fields of view in terms of viewing angle and/or range sensitivities.

In some embodiments, the view sensors 220 may be attached to a main housing 210 of the UAV 200. In some embodiments, the view sensors 220 may be integrated into the main housing 210 of the UAV 200, such that the view sensors 220 are exposed through openings in the main housing 210. In some embodiments, the view sensors 220a, 220b, 220c, 220d may be offset from one another (e.g., horizontally, vertically, or both horizontally and vertically), such that the view sensors may face different view directions to perceive (or sense) the environment surrounding the UAV 200.

The view sensors 220a, 220b, 220c, 220d may be characterized by the direction in which each view sensor faces (referred to herein as the view direction 230) and/or the field of view 232 of each view sensor. The view direction 230 may be a centerline of the field of view 232 of the sensor. Some view sensors may have a narrow field of view 232, such as laser radars (known as "lidar"), in which case the characteristic evaluated in the various embodiments may be only the view direction 230. Some view sensors may have a wide field of view 232, such as cameras equipped with a fish eye lens, and radars with near-omnidirectional antennas.

View sensors with a wide field of view 232 (e.g., 90 degrees as illustrated in FIG. 2B) may encompass the direction of travel of the UAV 200 even when the view direction 230 is not aligned with the direction of travel. For example, a view sensor 220a, 220b, 220c, 220d with a 90 degree field of view (as illustrated in FIG. 2B) may encompass the direction of travel of the UAV 200 when the view direction 230 is within 45 degrees of the direction of travel.

In some embodiments, the respective fields of view 232 of the view sensors 220 may overlap to some extent, such as to provide a complete 360 degree view of the environment. For example, if the four view sensors 220a, 220b, 220c, 220d illustrated in FIG. 2B have a field of view 232 of greater than 90 degrees, the fields of view of adjacent sensors would overlap in the illustrated configuration. In some embodiments, the view sensors 220 may be tilted away from the rotors 215 (e.g., upward or downward) in order to prevent the rotors 215 from entering into the respective fields of view of the sensors 220.

The UAV 200 may include an onboard computing device within the main housing 210 that is configured to fly and/or operate the UAV 200 without remote operating instructions (i.e., autonomously), and/or with some remote operating instructions or updates to instructions stored in a memory, such as from a human operator or remote computing device (i.e., semi-autonomously).

The UAV 200 may be propelled for flight in any of a number of known ways. For example, two or more propulsion units, each including one or more rotors 215, may provide propulsion or lifting forces for the UAV 200 and any payload carried by the UAV 200. In some embodiments, the UAV 200 may include wheels, tank-treads, or other non-aerial movement mechanisms to enable movement on the ground, on or in water, and combinations thereof. The UAV 200 may be powered by one or more types of power source, such as electrical, chemical, electro-chemical, or other power reserve, which may power the propulsion units, the onboard computing device, and/or other onboard components. For ease of description and illustration, some detailed aspects of the UAV 200 are omitted, such as wiring, frame structure, power source, landing columns/gear, or other features that would be known to one of skill in the art.

Although the UAV 200 is illustrated as a quad copter with four rotors, some embodiments of the UAV 200 may include more or fewer than four rotors 215. In addition, although the view sensors 220a, 220b, 220c, 220d are illustrated as being attached to UAV 200, the view sensors 220a, 220b, 220c, 220d may, in some embodiments, be attached to other types of vehicles, including both manned and unmanned vehicles.

Figure 3:
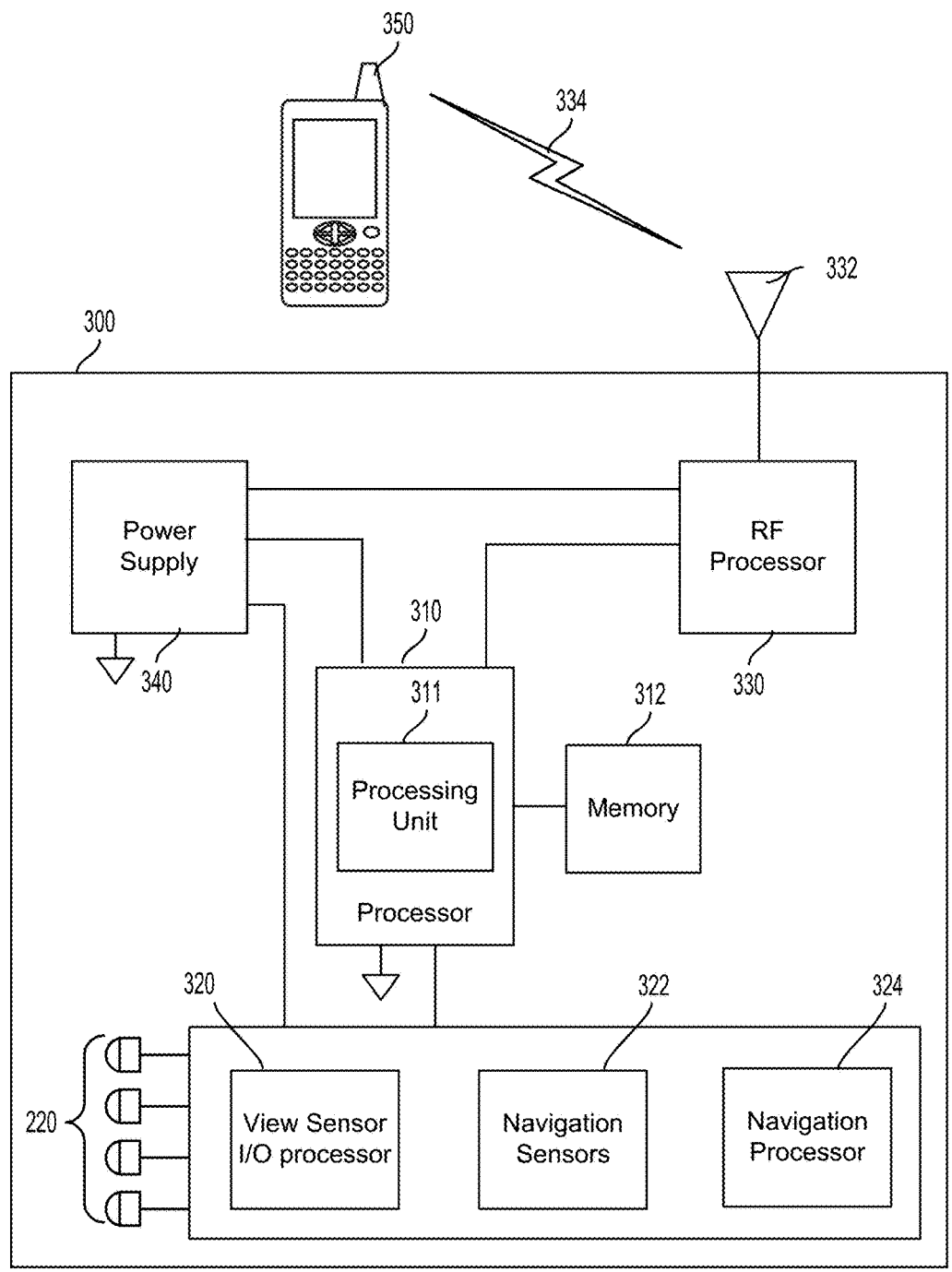
FIG. 3 illustrates components of a control unit for a vehicle that may be configured to implement methods of dynamically controlling parameters for processing output data from multiple view sensors on a vehicle for collision avoidance and/or path planning according to some embodiments.

FIG. 3 illustrates components of a control unit 300 for a vehicle (e.g., the UAV 110, 200 in FIGS. 1-2B) that may be configured to implement methods of dynamically controlling one or more parameters for processing output data from multiple view sensors on a vehicle based on speed and direction of travel according to some embodiments. With reference to FIGS. 1-3, the control unit 300 may include various circuits and devices used to power and control the operation of the vehicle. The control unit 300 may include a processor 310, memory 312, a view sensor input/output (I/O) processor 320, one or more navigation sensors 322, a navigation processor 324, a radio frequency (RF) processor 330 coupled to an antenna 332, and a power supply 340. The view sensor input/output (I/O) processor 320 may be coupled to multiple view sensors 220.

In some embodiments, the processor 310 may be dedicated hardware specifically adapted to implement a method of dynamically controlling one or more parameters for processing sensor data, such as controlling data processing rates of output data, from multiple view sensors 220 on the vehicle for collision avoidance and/or path planning according to some embodiments. In some embodiments, the processor 310 may also control other operations of the vehicle (e.g., flight of the UAV 200). In some embodiments, the processor 310 may be or include a programmable processing unit 311 that may be programmed with processor-executable instructions to perform operations of the various embodiments. In some embodiments, the processor 310 may be a programmable microprocessor, microcomputer or multiple processor chip or chips that can be configured by software instructions to perform a variety of functions of the vehicle. In some embodiments, the processor 310 may be a combination of dedicated hardware and a programmable processing unit 311.

In some embodiments, the memory 312 may store processor-executable instructions and/or outputs from the view sensor I/O processor 320, the one or more navigation sensors 322, navigation processor 324, or a combination thereof. In some embodiments, the memory 312 may be volatile memory, non-volatile memory (e.g., flash memory), or a combination thereof. In some embodiments, the memory 312 may include internal memory included in the processor 310, memory external to the processor 310, or a combination thereof.

The processor 310, the memory 312, the view sensor I/O processor 320, the one or more navigation sensors 322, the navigation processor 324, the RF processor 330, and any other electronic components of the control unit 300 may be powered by the power supply 340. In some embodiments, the power supply 340 may be a battery, a solar cell, or other type of energy harvesting power supply.

In some embodiments, the processor 310 may be coupled to the view sensor I/O processor 320, the one or more navigation sensors 322, the navigation processor 324, or a combination thereof. In some embodiments, the processor 310 may be further configured to receive and process the respective outputs of the view sensor I/O processor 320, the one or more navigation sensors 322, the navigation processor 324, or a combination thereof.

The processor 310 may be configured to receive output data from the view sensors 220 mounted on the vehicle. In some embodiments, the processor 310 may receive the output data directly from the view sensor I/O processor 320, which may be coupled to the view sensors 220. In some embodiments, the processor 310 may access the output data from the view sensors 220 via the memory 312.

The processor 310 may be configured to receive navigational data from the one or more navigation sensors 322 and/or the navigation processor 324. The processor 310 may be configured to use such data in order to determine the vehicle's present position, orientation, speed, velocity, direction of travel, or any combination thereof, as well as the appropriate course towards a desired destination. The one or more navigation sensors 322 may include one or more gyroscopes (typically at least three), a gyrocompass, one or more accelerators, location sensors, or other types of sensors useful in detecting and controlling the attitude and movements of the vehicle. Location sensors coupled to the navigation processor 324 may include a global navigation satellite system (GNSS) receiver (e.g., one or more Global Positioning System (GPS) receivers) enabling the vehicle (e.g., 300) to determine the vehicles coordinates, altitude, direction of travel and speed using GNSS signals. Alternatively or in addition, the navigation processor 324 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network base stations, radio stations, remote computing devices, other UAVs, etc. In some embodiments in which the vehicle is a UAV (e.g., 200), the one or more navigation sensors 322 may provide attitude information including vehicle pitch, roll, and yaw values.

In some embodiments, the processor 310 may be coupled to the RF processor 330 in order to communicate with a remote computing device 350. For example, in some embodiments, the RF processor 330 may be configured to receive signals 334 via the antenna 332, such as signals from navigation facilities, etc., and provide such signals to the processor 310 and/or the navigation processor 324 to assist in operation of the vehicle (e.g., 200). The RF processor 330 may be a transmit-only or a two-way transceiver processor. For example, the RF processor 330 may include a single transceiver chip or a combination of multiple transceiver chips for transmitting and/or receiving signals. The RF processor 330 may operate in one or more of a number of radio frequency bands depending on the supported type of communications.

The remote computing device 350 may be any of a variety of computing devices, including but not limited to a processor in cellular telephones, smart-phones, web-pads, tablet computers, Internet enabled cellular telephones, wireless local area network (WLAN) enabled electronic devices, laptop computers, personal computers, and similar electronic devices equipped with at least a processor and a communication resource to communicate with the RF processor 330. Information may be transmitted from one or more components of the control unit 300 (e.g., the processor 310) to the remote computing device 350 over a wireless link 334 using Bluetooth®, Wi-Fi® or other wireless communication protocol.

While the various components of the control unit 300 are illustrated in FIG. 3 as separate components, some or all of the components may be integrated together in a single device or module, such as a system-on-chip module.

Figure 4A:
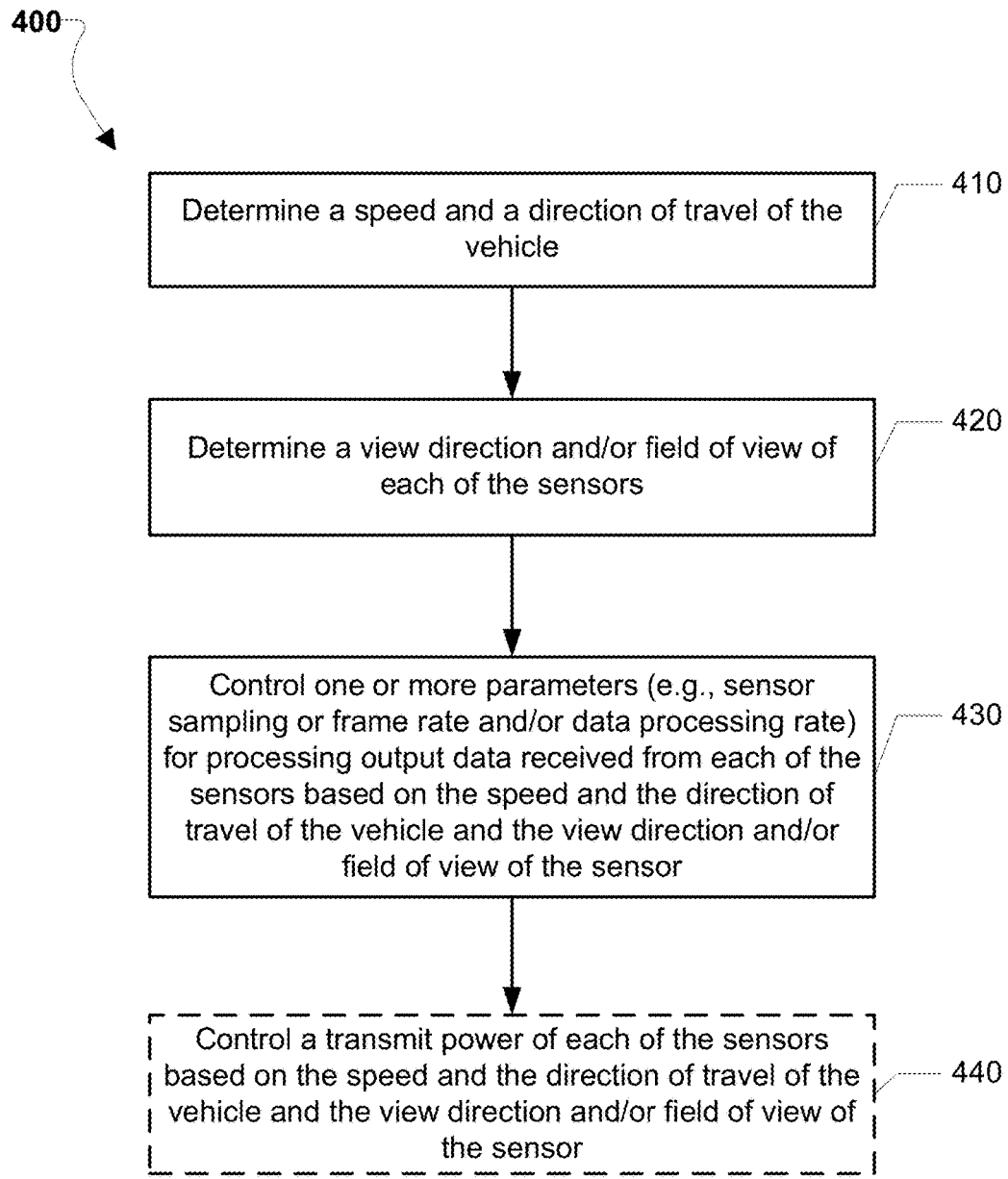
FIGS. 4A and 4B illustrate a method of dynamically controlling parameters for processing output data from multiple view sensors on a UAV for collision avoidance and/or path planning according to some embodiments.

FIG. 4A illustrates a method 400 of dynamically controlling one or more parameters for processing output data from multiple view sensors (e.g., 220a, 220b, 220c) on a vehicle (e.g., UAV 200) based in part upon the vehicle's speed and direction of travel according to some embodiments. With reference to FIGS. 1-4A, operations of the method 400 may be performed by the vehicle's control unit (e.g., 300).

In block 410, a processor (e.g., the processor 310 in the control unit 300) may determine a speed and a direction of travel of the vehicle in any suitable manner In some embodiments, the processor may obtain the vehicle's current speed or direction of travel from one or more of the navigation sensors (e.g., 322), the navigation processor 324, or both. In some embodiments, the processor may calculate vehicle's speed or direction of travel based on navigational data (e.g., position, orientation, time, etc.) provided by one or more of the navigation sensors (e.g., 322), the navigation processor 324, or both. In some embodiments, the direction of travel may be represented as a two-dimensional (2D) vector (e.g., left, right, forward, backwards or North, South, East, West, North-East, etc.). In some embodiments, the direction of travel may be represented as a three-dimensional (3D) vector.

In block 420, the processor may determine a view direction (e.g., 230) and/or field of view (e.g., 232) of each of the view sensors (e.g., 220a, 220b, 220c, 220d). In some embodiments, where the view direction and/or field of view of each view sensor is pre-configured (i.e., fixed), the processor may access information regarding the view direction (e.g., 230) and/or field of view (e.g., 232) for each view sensor stored in the memory 312. In some embodiments in which the view direction of each view sensor (i.e., centerline of the field of view) is controlled by the processor (e.g., 310) or remotely controlled by a remote computing device (e.g. 350), the processor (e.g., 310) may access information regarding the current view direction of each view sensor by requesting the view direction information directly from each sensor (e.g., via the view sensor I/O processor 320) or by accessing the view direction information of each view sensor from the memory 312. In some embodiments, the view direction of each view sensor may be represented as a two-dimensional (2D) vector (e.g., left, right, forward, backwards or North, South, East, West, North-East, etc.). In some embodiments, the view direction of each view sensor may be represented as a 3D vector. In some embodiments, the field of view of each view sensor may be represented as a 2D or 3D vector of a centerline (i.e., sensor view direction) and an angle about the 2D or 3D vector defining the expanse of the field of view.

In block 430, the processor (e.g., 310) may control one or more parameters for processing output data from each of the view sensors (e.g., 220a, 220b, and 220c) based on the speed and the direction of travel of the vehicle and the view direction (e.g., 230) and/or field of view (e.g., 232) of the view sensor. In various embodiments, the one or more parameters for processing output data from view sensors that may be controlled by the processor may include one or more of a data sampling rate, a sensor frame rate, a processing rate (i.e., a rate at which sensor data is processed), and/or a transmit power for view sensors that transmit (e.g., radar, sonar, etc.)

In some embodiments, the processor may throttle (or reduce) the data sampling and/or processing rate of the output data received from one or more view sensors with a view direction that is directed away from or a field of view that does not encompass the direction of travel of the moving vehicle. In some embodiments, the processor may control the view sensors to reduce the sampling or frame rate of those sensors with a view direction that is directed away from or with a field of view that does not encompass the direction of travel of the vehicle. In some embodiments, the processor may both control the sampling or frame rate of view sensors and adjust the rate at which sensor data is processed based on the field of view of each sensor and the direction and speed of travel of the vehicle. In some embodiments, the processor may maintain or increase the data sampling and/or processing rate of the output data received from one or more view sensors having a field of view that encompasses the direction of travel of the moving vehicle. Thus, processing demands may be reduced by focusing processing on sensor data in or that encompasses the direction of travel where the probability or likelihood of collision is greater, while reducing the sampling rate/frequency processing of data from view sensors with fields of view that do not encompass the direction of travel where the probability/likelihood of collision is less.

In optional block 440, the processor (e.g., 310) may control the transmit power of each of the view sensors (e.g., 220a, 220b, and 220c) based on the speed and the direction of travel of the vehicle and the view direction (e.g., 230) and/or field of view (e.g., 232) of the view sensor. View sensors using greater transmit power (e.g., radar sensors, sonar sensors, etc.) may be capable of perceiving the environment at greater distances from the sensor as compared to view sensors using less transmit power. In some embodiments, the processor may reduce the transmit power of one or more view sensors having a view direction that is directed away from or having a field of view that does not encompass the direction of travel of the moving vehicle. In some embodiments, the processor may maintain or increase the transmit power of one or more view sensors having a view direction aligned with or having a field of view that encompasses the direction of travel of the moving vehicle. Thus, power demands may be reduced by focusing transmit power to view sensors oriented towards the direction of travel where the probability or likelihood of collision is greater, while reducing the transmit power to view sensors oriented in directions other than the direction of travel where the probability/likelihood of collision is less.

Figure 4B:
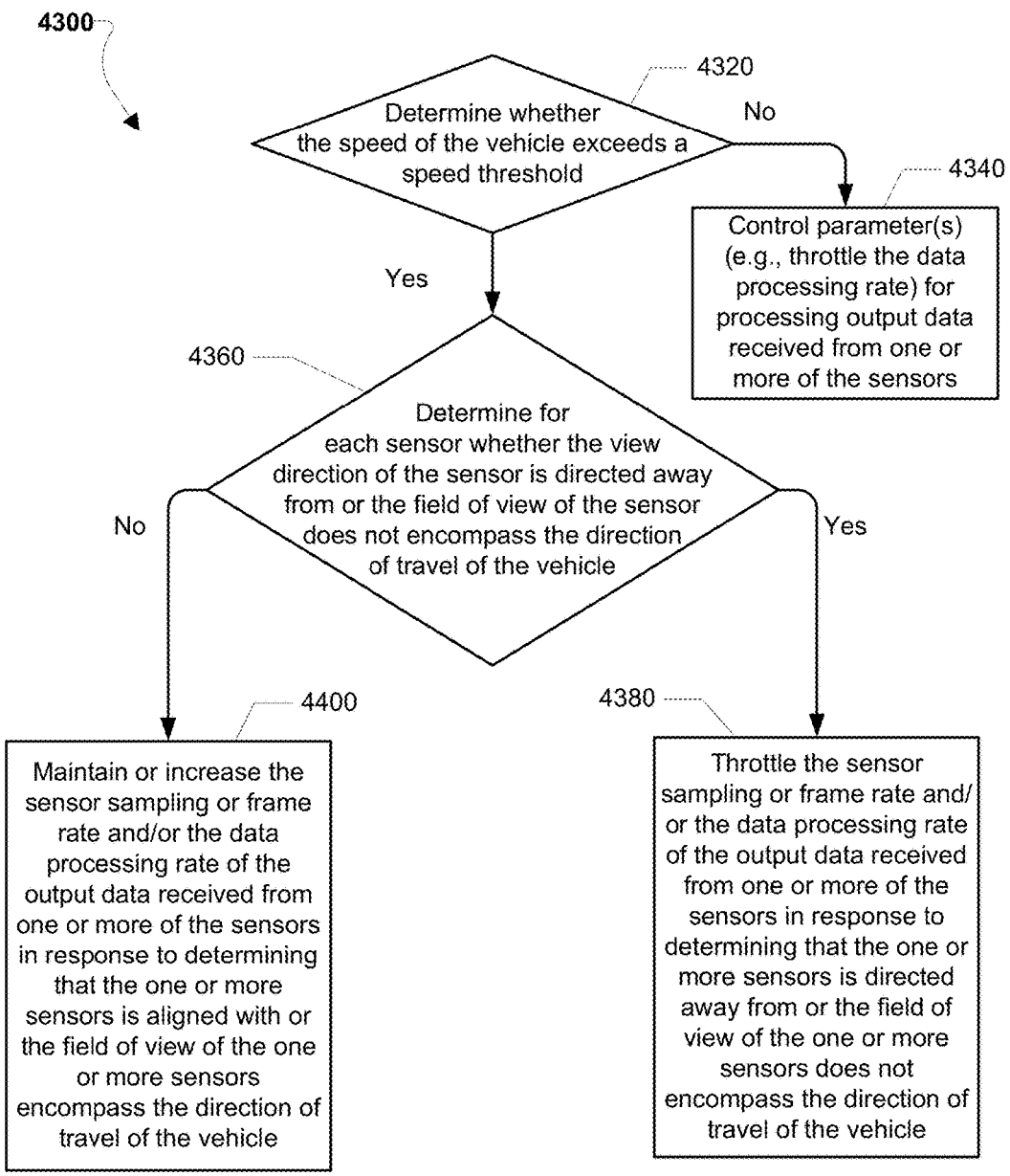

FIG. 4B is a flow diagram that illustrates a method 4300 of controlling one or more parameters for processing output data (e.g., a data processing rate, a sensor frame rate, etc.) received from each view sensor based on the speed and the direction of travel (i.e., block 430 of FIG. 4A) according to some embodiments. In some embodiments, for example, if the vehicle is travelling fast in a particular direction, there may be a high probability or likelihood that the vehicle will continue to travel in the same direction and that a collision with other vehicles or obstacles may occur in that direction. Thus, in some embodiments, the processor may throttle or reduce processing of output data from view sensors that perceive the environment in directions that do not encompass the current direction of travel. Conversely, if the vehicle is travelling slowly in a particular direction, there may be a high probability or likelihood that the vehicle may change direction and that a probability or likelihood of collision with other vehicles or obstacles may occur in any direction. Thus, in some embodiments, the processor may throttle or reduce the data processing rate equally across all view sensors.

With reference to FIGS. 1-4B, in determination block 4320, the processor (e.g., 310) may determine whether the speed of the vehicle (e.g., UAV 200) exceeds a speed threshold (i.e., the vehicle is travelling fast).

In response to determining that the speed of the vehicle does not exceed the speed threshold (i.e., determination block 4320="No"), the processor may adjust one or more parameters for processing output data (e.g., the data processing rate, sensor frame rate, etc.) received from one or more of the view sensors in block 4340. For example, in some embodiments, the processor may set the data processing rate to the same for data from all view sensors.

In response to determining that the speed of the vehicle exceeds the speed threshold (i.e., determination block 4320="Yes"), the processor may determine for each view sensor whether the view direction (e.g., 230) of the sensor is directed away from or the field of view (e.g., 232) does not encompass the direction of travel of the vehicle in determination block 4360.

In response to determining that one or more view sensors are directed away from or do not encompass the direction of travel of the vehicle (i.e., determination block 4360="Yes"), the processor may throttle the sensor sampling or frame rate and/or the data processing rate of the output data received from the one or more view sensors in block 4380. In some instances, the processor may place a view sensor directed away from the direction of travel in a low power mode.

In response to determining that the view direction of one or more view sensors are aligned with or encompass the direction of travel of the vehicle (i.e., determination block 4360="No"), the processor may maintain or increase the sensor sampling or frame rate and/or the data processing rate of the output data received from the one or more view sensors that are directed towards the direction of travel of the vehicle as described in block 4400.

Figure 5A:
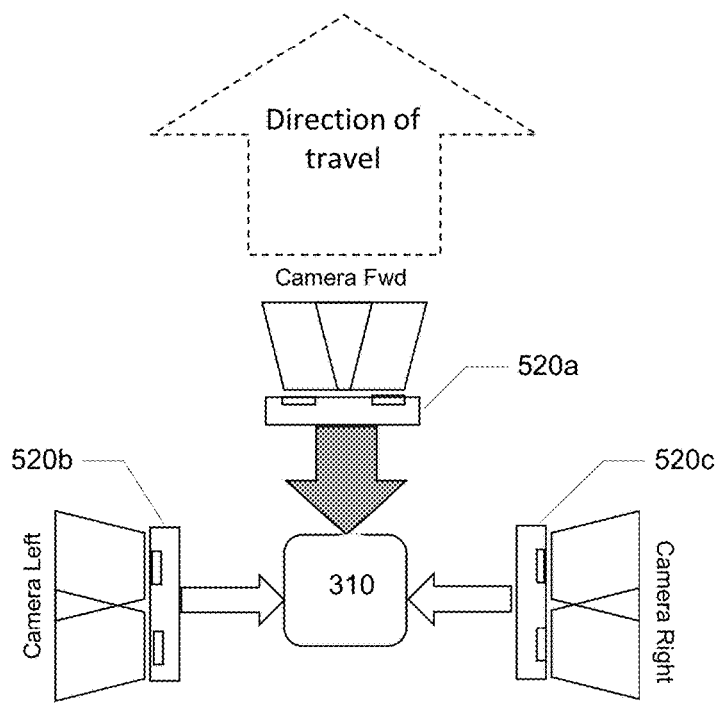
FIGS. 5A, 5B and 5C are schematic diagrams that illustrate a processor controlling parameters for processing output data from multiple stereoscopic cameras according to some embodiments.
Figure 5B:
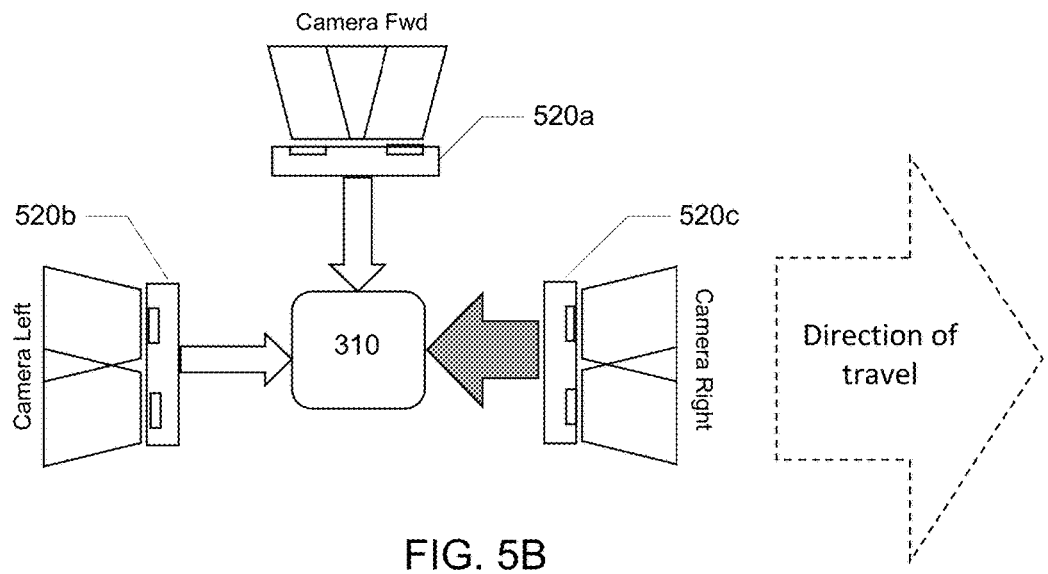
Figure 5C:
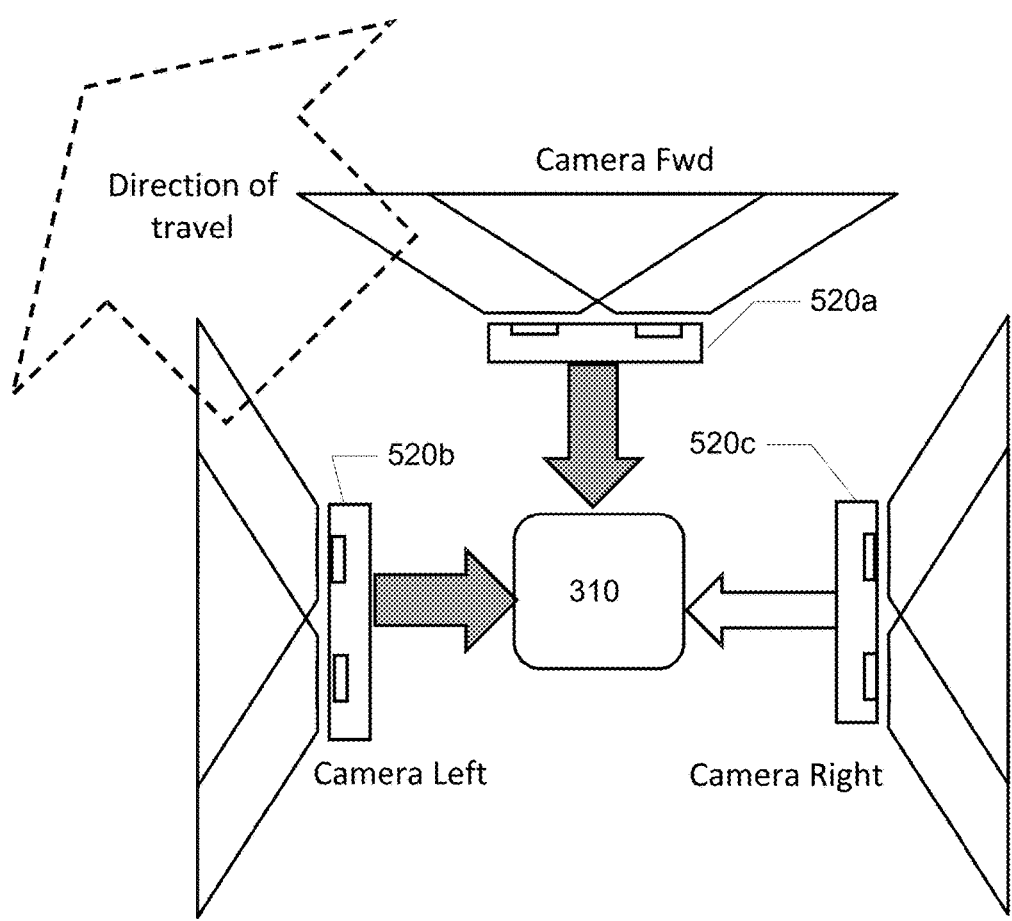

FIGS. 5A, 5B, and 5C are schematic diagrams that illustrate a processor (e.g., 310) controlling one or more parameters (e.g., sensor sampling or frame rates and/or data processing rates) for processing output data from multiple stereoscopic cameras 520a, 520b, 520c (which may correspond to the view sensors 220 in FIGS. 2A and 3 and view sensors 220a, 220b, 200c, 220d in FIG. 2B) based on the speed and the direction of travel of a vehicle (e.g., UAV 200) according to some embodiments. With reference to FIGS. 1-5C, a vehicle (e.g., robot, car, drone, etc.) may be equipped with a stereoscopic camera 520a facing forward, a stereoscopic camera 520b facing left, and a stereoscopic camera 520c facing right. The stereoscopic cameras 520a, 520b, 520c may be coupled directly or indirectly (e.g., via a view sensor I/O processor 320 of FIG. 3) to a processor (e.g., 310) that performs obstacle detection by processing the camera output data. As the vehicle moves, the processor processes image frames captured by each of the stereoscopic cameras 520a, 520b, and 520c to generate information (e.g., 3D depth maps) used in collision avoidance and/or path planning.

Images captured of the environment in the direction of travel may have a higher probability or likelihood of containing information useful for avoiding collisions. In particular, images captured in the direction of travel will reveal stationary objects that may be potential collision threats.

Thus, when the vehicle is moving in a forward direction (e.g., as shown in FIG. 5A), the processor (e.g., 310) may set the camera frame rate and/or process image frames captured by the left-facing stereoscopic image 520b and the right-facing stereoscopic camera 520c at a lower rate (i.e., fewer frames are received and/or processed per second) than the forward-facing stereoscopic camera 520a. For example, the processor may set the camera frame rate and/or process images frames from the left-facing stereoscopic image 520b and the right-facing stereoscopic camera 520c at a lower rate of five frames per second (fps) and set the camera frame rate and/or process image frames from the forward-facing stereoscopic camera 520a at a standard or increased rate of thirty frames per second (fps).

When the vehicle is moving in a lateral direction (e.g., to the right, such as in FIG. 5B), the processor may set the camera frame rate and/or process the images frames captured by the forward-facing stereoscopic camera 520a and the left-facing stereoscopic camera 520b at a lower rate than the image frames captured by the right-facing stereoscopic camera 520c.

When the vehicle is moving in a direction that is not perfectly aligned with the orientation of any of the view sensors (e.g., moving in the North-West direction, such as in FIG. 5C), the processor may set the camera frame rate and/or process the images frames captured by view sensors with a field of view that encompasses the direction of motion at a higher rate than for sensors with a field of view that does not encompass the direction of travel. In the example illustrated in FIG. 5C, the forward-facing stereoscopic camera 520a and the left-facing stereoscopic camera 520b have fields of view that overlap and encompass the direction of travel. Therefore, the camera frame rate and/or process the images frames captured by shows view sensors may be set at a rate that is greater (e.g., proportionally more) than the rate of capture and/or processing of image frames by the right-facing stereoscopic camera 520c.

Referring to FIGS. 1-5C, in some implementations, such as when the vehicle is an aircraft or a waterborne vessel, the processor (e.g., 310) may receive radio signals broadcast from other vessels that indicate the other vessel's location, speed, and direction. For example, commercial aircraft transmit Automatic Dependent Surveillance-Broadcast (ADS-B) signals that inform other aircraft of their respective location, altitude, direction of travel and speed. Similarly, ships and other waterborne vessels broadcast Automatic Identification System (AIS) signals that inform other vessels of their respective location, direction of travel, speed and turning rate. In such systems, each vessel broadcasts its location, speed, and direction, and each vessel processes signals received from other vessels to calculate probability of collision and/or a closest point of approach (CPA). Thus, in some embodiments, in addition to adjusting the sampling and/or processing rate of other view sensors (e.g., radar), the processor (e.g., 310) may prioritize the processing of AIS or ADS-B signals from vessels that present the greatest risk of collision. For example, if the vehicle is moving fast, the processor may throttle the data processing rate of AIS or ADS-B signals received from other vessels (e.g., via one or more view sensors 220) that are not in the direction of travel, while increasing the data processing rate of signals received from other vessels in the direction of travel. Conversely, if the vehicle is moving slowly compared to other vessels, the signals received from all other vessels (e.g., via the view sensors 220) may be processed equally as the threat of collision may come from any direction (i.e., there is little or no preferential processing of signals based the direction of travel).

Figure 6:
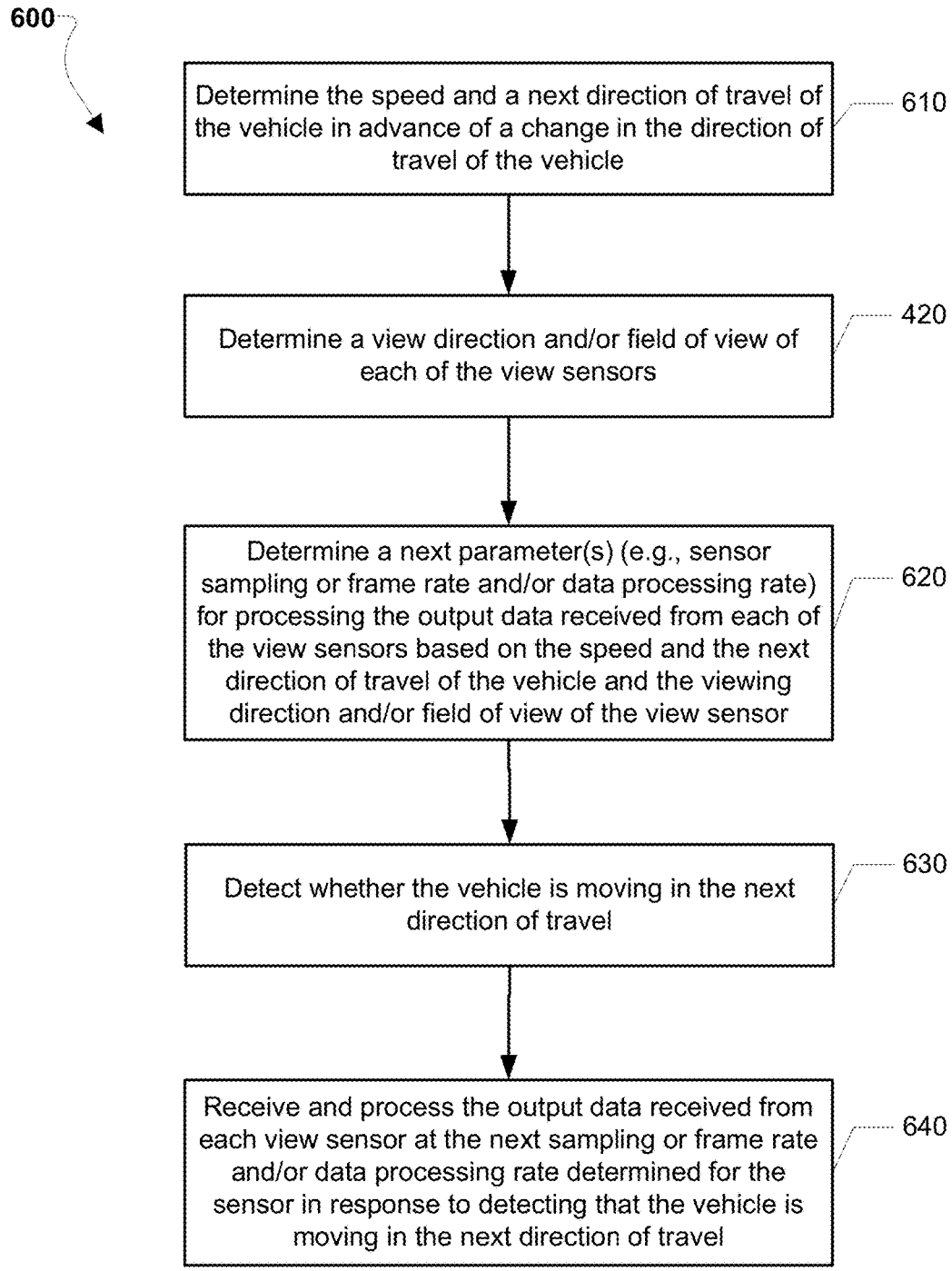
FIG. 6 illustrates another method of dynamically controlling parameters for processing output data from multiple view sensors on a vehicle for collision avoidance and/or path planning according to some embodiments.

FIG. 6 illustrates a method 600 of dynamically controlling one or more parameters (e.g., sensor sampling or frame rate and/or data processing rates) for processing output data from multiple view sensors on a vehicle for collision avoidance and/or path planning according to some embodiments. With reference to FIGS. 1-6, operations of the method 600 may be performed by the vehicle's control unit (e.g., 300 in FIG. 3). The method 600 may include operations in block 420 (e.g., as described with reference to FIG. 4A).

In block 610, the processor (e.g., the processor 310 in the control unit 300) may determine a speed and an anticipated next direction of travel of the vehicle. For example, the processor may obtain information regarding an anticipated course change or a preconfigured navigation path to determine the speed and the next direction of travel in advance of a change in the direction of travel of the vehicle. In some embodiments, such information or knowledge may be obtained from a navigation processor (e.g., 324 in the control unit 300).

In block 620, the processor (e.g., 310) may determine a next parameter or parameters (e.g., sensor sampling or frame rate and/or data processing rate) for processing the output data received from each of the view sensors (e.g., 220a, 220b, 220c or 520a, 520b, 520c) based on the speed and the next direction of travel of the vehicle and the view direction (e.g., 230) and/or the field of view (e.g., 232) of the view sensor. For example, in some embodiments, the processor may select or calculate a throttled (or reduced) sensor sampling or frame rate and/or data processing rate for processing the output data received from one or more view sensors (e.g., 220) associated having a view direction that is directed away from and/or a field of view not encompassing the next direction of travel of the moving vehicle. In some embodiments, the processor may maintain the current sensor sampling or frame rate and/or data processing rate for processing the output data received from one or more view sensors with a view direction that is directed towards and/or a field of view encompassing the next direction of travel of the moving vehicle. In some embodiments, the processor may select or calculate an increased sensor sampling or frame rate and/or data processing rate for processing the output data received from one or more view sensors with a view direction that is directed towards and/or a field of view encompassing the next direction of travel of the moving vehicle.

In block 630, the processor (e.g., 310) may detect whether the vehicle is moving in the next direction of travel. For example, in some embodiments, the processor may detect whether the vehicle is moving in the next direction of travel based on information obtained from one or more of the navigation sensors (e.g., 322), the navigation processor (e.g., 324), or both.

In block 640, the processor (e.g. 310) may process the output data received from each view sensor according to the next parameter(s) for processing sensor data (e.g., the next sensor sampling or frame rate and/or data processing rate) determined for the view sensor in response to detecting that the vehicle is moving in the next direction of travel. In this way, the processor may schedule the rate at which to receive and/or process sensor data from view sensors that have a view direction and/or field of view in one or more anticipated directions of travel or aligned with the pre-configured path.

Figure 7:
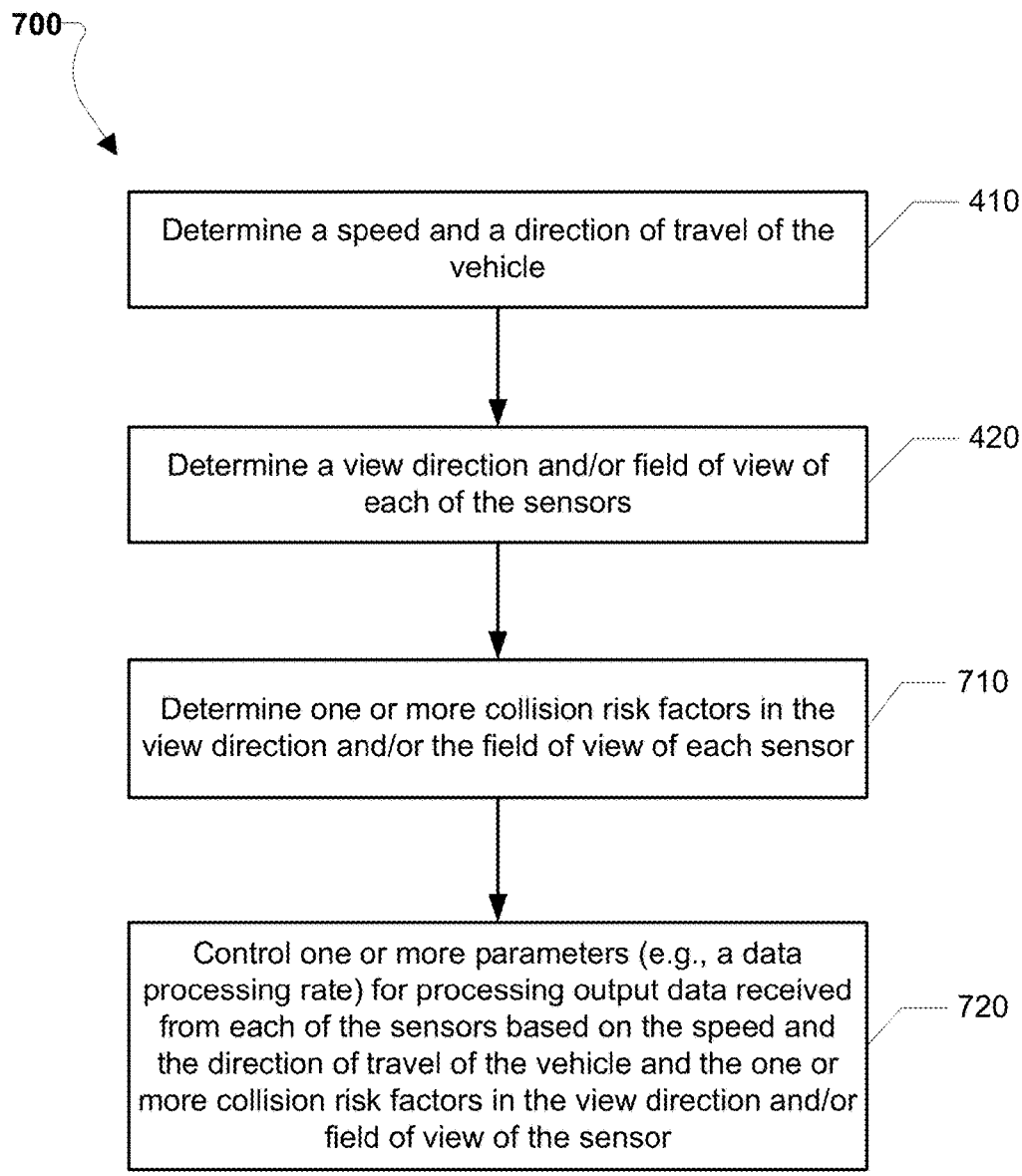
FIG. 7 illustrates another method of dynamically controlling parameters for processing output data from multiple view sensors on a vehicle for collision avoidance and/or path planning according to some embodiments.

FIG. 7 illustrates a method 700 of dynamically controlling one or more parameters (e.g., sensor sampling or frame rate and/or data processing rates) for processing output data from multiple view sensors (e.g., 220, 520 in FIGS. 2B and 5A-5C) on a vehicle (e.g., UAV 200) for collision avoidance and/or path planning according to some embodiments. For example, in some embodiments, the rate at which various view sensors around the vehicle (including different types of view sensors) may be sampled and processed based upon the risk of collision in each of the different view directions of the view sensors. In some embodiments, the probability or likelihood of collision in a particular direction may take into account one or more different collision risk factors in addition to the vehicle's speed and direction of travel.

With reference to FIGS. 1-7, operations of the method 700 may be performed by the vehicle's control unit (e.g., 300). The method 700 may include operations in blocks 410 and 420 (e.g., as described with reference to FIG. 4A).

In block 710, the processor (e.g., 310) may determine one or more collision risk factors in the view direction and/or the field of view of each sensor. In some embodiments, the one or more collision risk factors may include detection of an obstacle in the view direction, a speed of the detected obstacle in the view direction (e.g., speed of other UAVs, missiles, animals, etc.), one or more of at least one operational characteristic of the sensor, one or more vehicle handling parameters (e.g., stopping distance, turning radius, etc. as a function of speed), a processing characteristic of the processor (e.g., bandwidth, available memory, etc.), or any combination thereof.

In some embodiments, for example, an operational characteristic of a sensor may include the detection range of the sensor, the frame rate or scan rate of the sensor, the amount of output data generated by the sensor to process (e.g., output data from radar sensors may require less processing as compared to 3D image data from stereoscopic cameras that require significant processing), the effectiveness of each sensor in current conditions (e.g., radar sensors typically operate better at night and in fog, while cameras work better during daylight on clear days), and the reliability of the sensor for detecting collision threats (e.g., radar sensors are typically unreliable for detecting birds and vehicles).

In block 720, the processor may control one or more parameters (e.g., a sensor sampling or frame rate and/or data processing rate) for processing output data received from each of the sensors based on the vehicle's speed and the direction of travel and the one or more collision risk factors in the view direction and/or field of view of the sensor. In some embodiments, the processor may calculate a probability or likelihood of collision based on the vehicle's speed and the direction of travel and the one or more collision risk factors in the view direction and/or field of view of each sensor and then use the calculated probability of collision in deciding whether to throttle, increase or maintain the sensor sampling or frame rate and/or data processing rate of output data from a particular sensor.

For example, if the processor (e.g., 310) determines that the vehicle is travelling North at a low speed and a moving obstacle is traveling at high speeds toward the vehicle from the West, the processor (e.g., 310) may throttle the sensor sampling or frame rate and/or data processing rate of output data received from the sensors (e.g., 220) that are directed away from the direction of the moving obstacle as the threat of collision is higher in the direction of West. In some embodiments in which one or more view sensors (e.g., 220) face or perceive the environment in the direction of the collision threat, the processor may throttle the sensor sampling or frame rate and/or processing of data from one or more sensors that are not as effective, reliable or fast enough in detecting obstacles in current conditions (e.g., night, day, fog, etc.).

The various embodiments illustrated and described are provided merely as examples to illustrate various features of the claims. However, features shown and described with respect to any given embodiment are not necessarily limited to the associated embodiment and may be used or combined with other embodiments that are shown and described. In particular, various embodiments are not limited to use on aerial UAVs and may be implemented on any form of UAV, including land vehicles, waterborne vehicles and space vehicles in addition to aerial vehicles. Further, the claims are not intended to be limited by any one example embodiment. For example, one or more of the operations of the methods 400, 4300, 600, and 700 may be substituted for or combined with one or more operations of the methods 400, 4300, 600, and 700, and vice versa.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a two or more microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of dynamically controlling a plurality of sensors on a vehicle, comprising:
   determining, by a processor of the vehicle, a speed and a direction of travel of the vehicle;
   determining, by the processor, one or more of a view direction and a field of view of each of the plurality of sensors; and
   controlling, by the processor, a sampling or frame rate of one or more of the plurality of sensors based on the speed and the direction of travel of the vehicle and the one or more of the view direction and the field of view of each sensor.

2. The method of claim 1, further comprising controlling, by the processor, a rate at which output data received from one or more of the plurality of sensors is processed.

3. The method of claim 2, wherein controlling the rate at which output data received from one or more of the plurality of sensors is processed comprises:
   determining, by the processor, whether the speed of the vehicle exceeds a speed threshold;
   determining, by the processor, for each of the plurality of sensors whether the view direction of the sensor is directed away from or the field of view of the sensor does not encompass the direction of travel of the vehicle in response to determining that the speed of the vehicle exceeds the speed threshold; and
   throttling, by the processor, a data processing rate of output data received from one or more of the of the plurality of sensors in response to determining that the view direction of the one or more of the plurality of sensors is directed away from or the field of view of the one or more of the plurality of sensors does not encompass the direction of travel of the vehicle.

4. The method of claim 3, further comprising:
   maintaining or increasing, by the processor, the data processing rate of output data received from one or more of the plurality of sensors in response to determining that the view direction of the one or more of the plurality of sensors are aligned with or the field of view of the one or more of the plurality of sensors encompass the direction of travel of the vehicle.

5. The method of claim 3, further comprising:
   equalizing, by the processor, the data processing rate of output data received from the plurality of sensors in response to determining that the speed of the vehicle does not exceed the speed threshold.

6. The method of claim 1, further comprising:
   determining, by the processor, the speed and a next direction of travel of the vehicle in advance of a change in the direction of travel of the vehicle;
   determining, by the processor, a next data processing rate for processing the output data received from each of the plurality of sensors based on the speed and the next direction of travel of the vehicle and the one or more of the view direction and the field of view of the sensor;

detecting, by the processor, whether the vehicle is moving in the next direction of travel; and processing, by the processor, the output data received from each of the plurality of sensors at the next data processing rate for the sensor in response to detecting that the vehicle is moving in the next direction of travel.

7. The method of claim 1, wherein the plurality of sensors comprise one or more of cameras, stereoscopic cameras, image sensors, radar sensors, sonar sensors, ultrasound sensors, depth sensors, activate sensors, passive sensors, or any combination thereof.

8. The method of claim 2, further comprising:
determining, by the processor, one or more collision risk factors in the one or more of the view direction and the field of view of each sensor,
wherein controlling the rate at which output data received from one or more of the plurality of sensors is processed comprises controlling, by the processor, a data processing rate of output data received from each of the plurality of sensors based on the speed and the direction of travel of the vehicle and the one or more collision risk factors in the one or more of the view direction and the field of view of each sensor.

9. The method of claim 8, wherein the one or more collision risk factors comprise one or more of at least one operational characteristic of the sensor, detection of an obstacle within the field of view, a speed of a detected obstacle within the field of view, one or more vehicle handling parameters, a processing characteristic of the processor, or any combination thereof.

10. The method of claim 1, further comprising:
controlling, by the processor, a transmit power of each of the plurality of sensors based on the speed and the direction of travel of the vehicle and the one or more of the view direction and the field of view of the sensor.

11. The method of claim 1, wherein the vehicle is an unmanned vehicle.

12. The method of claim 11, wherein the unmanned vehicle is one of an aerial vehicle, a terrestrial vehicle, a space-based vehicle, or an aquatic vehicle.

13. A computing device for a vehicle, comprising:
a processor configured with processor-executable instructions to:
determine a speed and a direction of travel of the vehicle;
determine one or more of a view direction and a field of view of each of a plurality of sensors on the vehicle; and
control a sampling or frame rate of one or more of the plurality of sensors based on the speed and the direction of travel of the vehicle and the one or more of the view direction and the field of view of each sensor.

14. The computing device of claim 13, wherein the processor is further configured with processor-executable instructions to control
a rate at which output data received from one or more of the plurality of sensors is processed.

15. The computing device of claim 14, wherein the processor is further configured with processor-executable instructions to:
determine whether the speed of the vehicle exceeds a speed threshold;
determine for each sensor whether the view direction of the sensor is directed away from or the field of view of the sensor does not encompass the direction of travel of the vehicle in response to determining that the speed of the vehicle exceeds the speed threshold; and
throttle the data processing rate of the output data received from the one or more of the plurality of sensors in response to determining that the view direction of the one or more of the plurality of sensors is directed away from or the field of view of the one or more of the plurality of sensors does not encompass the direction of travel of the vehicle.

16. The computing device of claim 15, wherein the processor is further configured with processor-executable instructions to:
maintain or increase the data processing rate of the output data received from one or more of the plurality of sensors in response to determining that the view direction of the one or more of the plurality of sensors are aligned with or the field of view of the one or more of the plurality of sensors encompass the direction of travel of the vehicle.

17. The computing device of claim 15, wherein the processor is further configured with processor-executable instructions to:
equalize the data processing rate of the output data received from the plurality of sensors in response to determining that the speed of the vehicle does not exceed the speed threshold.

18. The computing device of claim 13, wherein the processor is further configured with processor-executable instructions to:
determine the speed and a next direction of travel of the vehicle in advance of a change in the direction of travel of the vehicle;
determine a next data processing rate for processing the output data received from each of the plurality of sensors based on the speed and the next direction of travel of the vehicle and the one or more of the view direction and the field of view of each sensor;
detect when the vehicle is moving in the next direction of travel; and
process the output data received from each of the plurality of sensors at the next data processing rate for the sensor in response to detecting that the vehicle is moving in the next direction of travel.

19. The computing device of claim 14, wherein the processor is further configured with processor executable instructions to:
determine one or more collision risk factors in the one or more of the view direction and the field of view of each sensor; and
control the rate at which output data received from one or more of the plurality of sensors is processed based on the speed and the direction of travel of the vehicle and the one or more collision risk factors in the one or more of the view direction and the field of view of each sensor.

20. The computing device of claim 19, wherein the one or more collision risk factors comprise one or more of at least one operational characteristic of the sensor, detection of an obstacle within the field of view, a speed of a detected obstacle within the field of view, one or more vehicle handling parameters, a processing characteristic of the processor, or any combination thereof.

21. The computing device of claim 13, wherein the processor is further configured with processor executable instructions to:
control a transmit power of each of the plurality of sensors based on the speed and the direction of travel of the vehicle and the one or more of the view direction and the field of view of each sensor.

22. A non-transitory processor-readable storage medium having stored thereon processor-executable instructions configured to cause a processor of a computing device for a vehicle to perform operations comprising:
  determining a speed and a direction of travel of the vehicle;
  determining one or more of a view direction and a field of view of each of a plurality of sensors on the vehicle; and
  controlling, by the processor, a sampling or frame rate of one or more of the plurality of sensors based on the speed and the direction of travel of the vehicle and the one or more of the view direction and the field of view of each sensor.

23. The non-transitory processor-readable storage medium of claim 22, wherein the stored processor-executable instructions are configured to cause the processor to control a rate at which output data received from one or more of the plurality of sensors is processed.

24. The non-transitory processor-readable storage medium of claim 23, wherein the stored processor-executable instructions are configured to cause the processor to perform operations further comprising:
  determining whether the speed of the vehicle exceeds a speed threshold;
  determining for each sensor whether the view direction of the sensor is directed away from or the field of view of the sensor does not encompass the direction of travel of the vehicle in response to determining that the speed of the vehicle exceeds the speed threshold; and
  throttling the data processing rate of the output data received from one or more of the plurality of sensors in response to determining that the view direction of the one or more of the plurality of sensors is directed away from or the field of view of the one or more of the plurality of sensors does not encompass the direction of travel of the vehicle.

25. The non-transitory processor-readable storage medium of claim 22, wherein the stored processor-executable instructions are configured to cause the processor to perform operations further comprising:
  determining one or more collision risk factors in the one or more of the view direction and the field of view of each sensor; and
  controlling the data processing rate of output data received from each of the plurality of sensors based on the speed and the direction of travel of the vehicle and the one or more collision risk factors within the field of view of each sensor.

26. The non-transitory processor-readable storage medium of claim 22, wherein the stored processor-executable instructions are configured to cause the processor to perform operations further comprising:
  control a transmit power of each of the plurality of sensors based on the speed and the direction of travel of the vehicle and the one or more of the view direction and the field of view of the sensor.

27. A computing device for a vehicle, comprising:
  means for determining a speed and a direction of travel of the vehicle;
  means for determining one or more of a view direction and a field of view of each of a plurality of sensors on the vehicle; and
  means for controlling a sampling or frame rate of one or more of the plurality of sensors based on the speed and the direction of travel of the vehicle and the one or more of the view direction and the field of view of each sensor.

* * * * *